June 7, 1938. H. B. HOLMES ET AL 2,119,540
METHOD AND APPARATUS FOR TRANSFERRING MIGRATORY FISH OVER A DAM STRUCTURE
Filed June 2, 1937 9 Sheets-Sheet 1

FIG. 1

INVENTOR
Harlan B Holmes, Henry F. Blood,
and Milo C. Bell.
BY
Adam Richmond
HIS ATTORNEY June 7, 1938.   H. B. HOLMES ET AL   2,119,540
METHOD AND APPARATUS FOR TRANSFERRING MIGRATORY FISH OVER A DAM STRUCTURE
Filed June 2, 1937   9 Sheets-Sheet 2

FIG. 2.

INVENTOR
Harlan B. Holmes, Henry F. Blood
and Milo C. Bell,
BY
HIS ATTORNEY

Fig. 3

June 7, 1938. H. B. HOLMES ET AL 2,119,540
METHOD AND APPARATUS FOR TRANSFERRING MIGRATORY FISH OVER A DAM STRUCTURE
Filed June 2, 1937 9 Sheets-Sheet 4

FIG. 4

INVENTOR
Harlan B. Holmes, Henry F. Blood
and Milo C. Bell.
BY
HIS ATTORNEY

June 7, 1938. H. B. HOLMES ET AL 2,119,540
METHOD AND APPARATUS FOR TRANSFERRING MIGRATORY FISH OVER A DAM STRUCTURE
Filed June 2, 1937 9 Sheets-Sheet 5

INVENTOR
Harlan B. Holmes, Henry F. Blood
and Milo C. Bell
BY
Adam Richmond
HIS ATTORNEY June 7, 1938. H. B. HOLMES ET AL 2,119,540
METHOD AND APPARATUS FOR TRANSFERRING MIGRATORY FISH OVER A DAM STRUCTURE
Filed June 2, 1937 9 Sheets-Sheet 6

INVENTOR
Harlan B. Holmes, Henry F. Blood,
and Milo C. Bell
BY
Adam Richmond
HIS ATTORNEY

Patented June 7, 1938

2,119,540

UNITED STATES PATENT OFFICE 2,119,540

METHOD AND APPARATUS FOR TRANSFERRING MIGRATORY FISH OVER A DAM STRUCTURE

Harlan B. Holmes and Henry F. Blood, Portland, Oreg., and Milo C. Bell, Seattle, Wash., assignors to United States of America as represented by the Secretary of War Application June 2, 1937, Serial No. 146,016

23 Claims. (Cl. 61—21)

(Granted under the act of March 3, 1883, as amended April 30, 1928; 370 O. G. 757)

This invention described herein may be manufactured and used by or for the Government for governmental purposes, without the payment to us of any royalty thereon.

Our invention relates to improvements in the lock type of fishway for conveying migratory fish past dams and other obstructions. It relates especially to methods and structures for improving the hydraulic attraction to lure fish into the lock chamber and to secure their departure therefrom at a higher level without injury to them.

Migratory fish, especially the active fish such as salmon and trout, in seeking a route of passage at an obstruction, are attracted by continuously flowing water of moderate velocity. They hesitate to enter areas of intermittent flow especially and are not readily attracted to areas in which the flow is extremely variable.

It has also been found that when fish are disturbed while confined, as in the chamber of a fishlock, their tendency is to lie quietly in the bottom of the confining area, evidently attempting to hide from the disturbing influence.

These traits and habits of the fish have not been given adequate consideration in previous designs of fishlocks, and as a result such fishlocks have had very little success except at very low dams and with the more sluggish varieties of fish.

In previous known designs of fishlocks, drainage of the lock chamber has been accomplished by discharging the water directly from the lock chamber into the tailrace at a point in immediate proximity to the fish entrance to the lock. As a result there is produced in the discharge area a sudden surge of water at high velocity as the lock starts to drain. The quantity of water flowing from the lock chamber decreases as the chamber empties and ceases entirely when the lock entrance is closed for lockage.

Previous known designs have in some instances provided means of assuring that the fish will reach the higher water level in the lock chamber but none has provided an auxiliary mechanical means of assuring the departure of the fish from the lock chamber into the forebay, such as by shoaling.

With these defects in previous known designs in mind, an important object of our invention is to improve the attractiveness of the entrance to a system of fishlocks by providing a continuous and relatively uniform flow of water to lure the fish into the lock chamber.

A further object of our invention is to assure the departure of the fish from the lock chamber at a higher water level by producing a flow of water against which the fish may swim and by gently urging the fish toward the exit.

A still further object of our invention is to provide a system of fishlocks in which by the alternate operation of the two fishlocks, one lock chamber is constantly open for the entrance of fish and is discharging a continuous flow of water therefrom to attract the fish into the lock chamber.

Other objects and objects relating to details of construction, combination and arrangement of parts will hereinafter appear in the detailed description to follow.

The drawings hereinafter referred to represent an actual rather than an ideal embodiment of our invention and as so presented details of design have been influenced by structural, space and location requirements and in some instances include novel structural features of others which have been made the subject of separate patent applications which we do not claim as part of our invention.

Referring more particularly to the accompanying drawings in which corresponding parts are indicated by similar reference characters.

Figure 1:
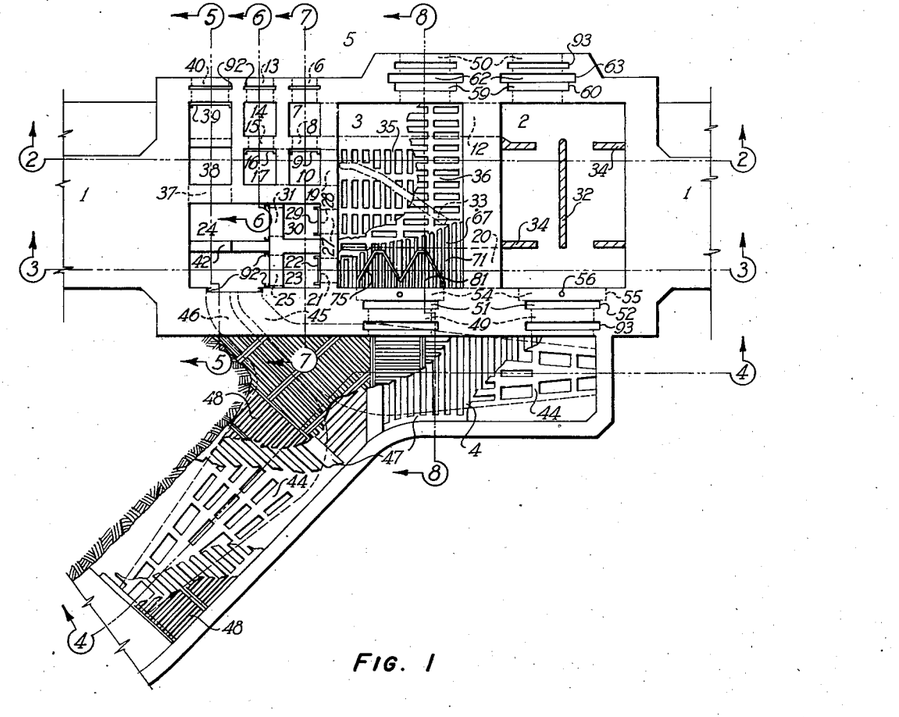
Figure 1 is a fragmentary plan view, partly in section, of an actual embodiment of the invention shown in connection with a dam structure having relatively great variations in tailrace and forebay elevations. In this view, operating mechanisms, walkways, and the like have been omitted to clarify the design of the structure.
Figure 2:
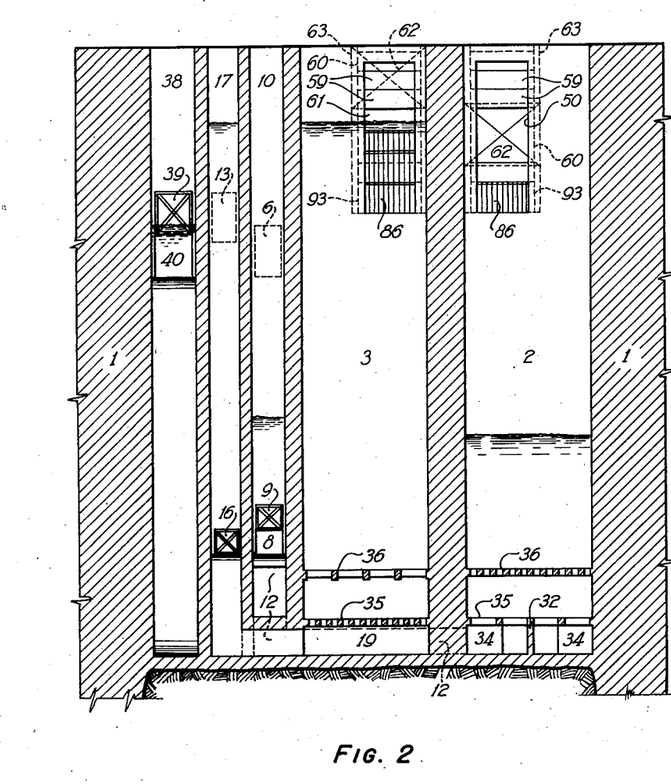
Figure 2 is a transverse sectional fragmentary view of the device shown in Figure 1, taken substantially along the line 2—2 and in the direction indicated. In this view the elevators, etc. have been omitted.

In Figure 1 is shown an actual embodiment of the fishlock structure incorporated in a dam structure (1). A plurality of fishlocks, here shown as two in number, (2) and (3), are suitably arranged in gate controlled communication with an entry bay (4) and a forebay (5).

The fishlocks (2) and (3) are each provided with suitable water supply means.

Figure 7:
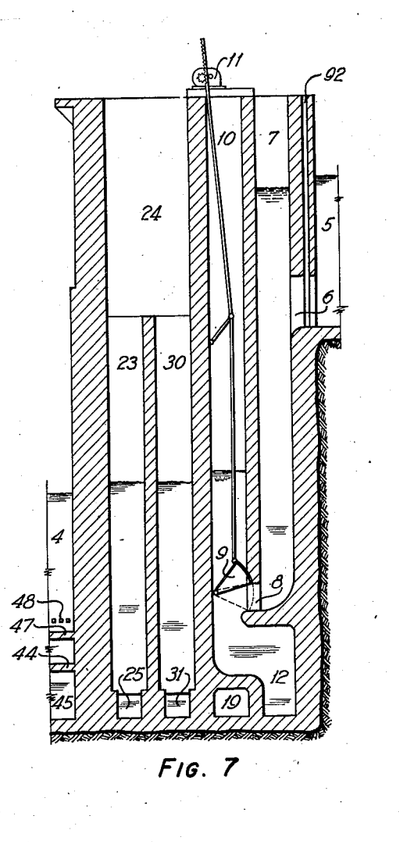
Figure 7 is a vertical sectional view of the device shown in Figure 1, taken substantially along the line 7—7 and in the direction indicated.

For the fishlock (2), water from the forebay (5) is admitted through an aperture (6) to a well (7) having a portal (8) at its bottom. A tainter valve (9) located in tainter valve pit (10), adjacent to well (7), controls the portal (8). The tainter valve (9) is actuated by suitable means as mechanism (11). A conduit (12) effects open communication between the tainter valve pit (10) and the lock (2). This condition is best disclosed in Figure 7, wherein the tainter valve (9) is shown in opened position.

Figure 6:
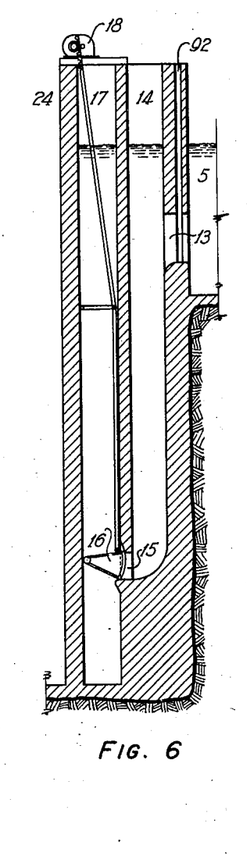
Figure 6 is a vertical sectional view of the device shown in Figure 1, taken substantially along the line 6—6 and in the direction indicated.

For the fishlock (3), water from the forebay (5) is admitted through an aperture (13) to a well (14) having a portal (15) at its bottom. A tainter valve (16) located in tainter valve pit (17) adjacent to the well (14), controls the portal (15). The tainter valve (16) is actuated by suitable means as mechanism (18). A conduit (19) effects open communication between the tainer valve pit (17) and the lock (3). This apparatus is best disclosed in Figure 6, wherein the tainter valve (16) is shown in closed position.

The fishlocks (2) and (3) are each provided with suitable drainage means.

Figure 3:
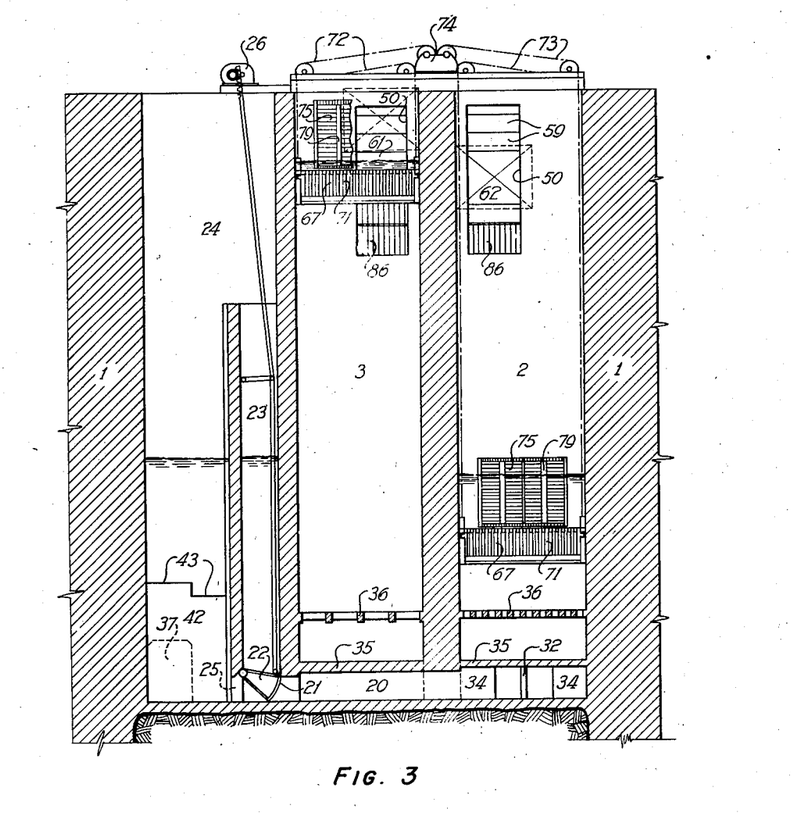
Figure 3 is a transverse sectional fragmentary view of the device shown in Figure 1, taken substantially along the line 3—3 and in the direction indicated.
Figure 4:
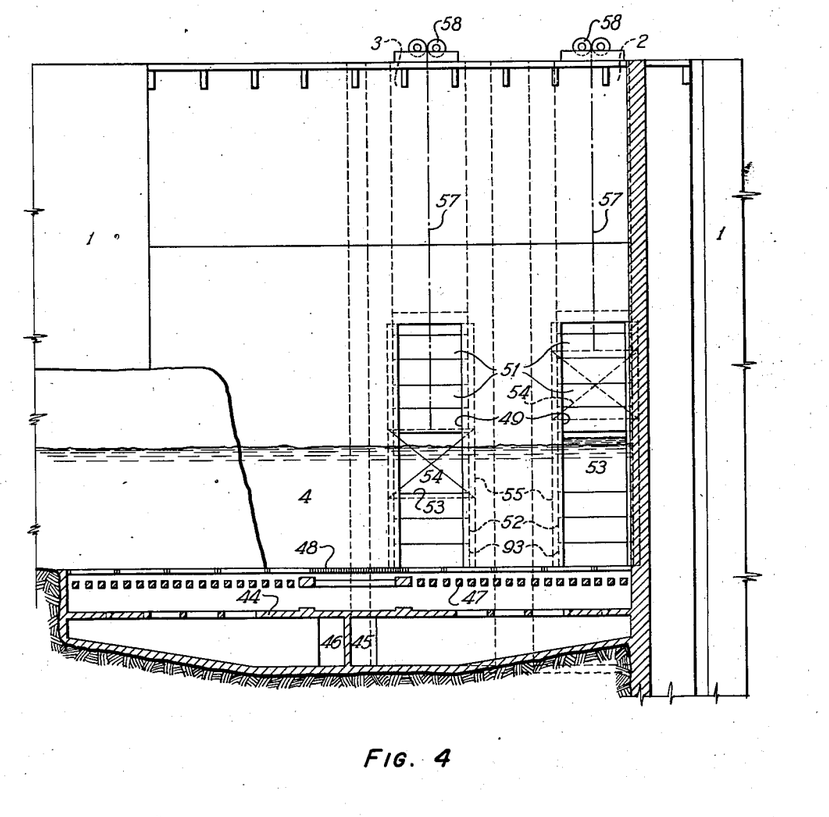
Figure 4 is a transverse sectional fragmentary view of the device shown in Figure 1, taken substantially along the line 4—4 and in the direction indicated.

For the fishlock (2), water therefrom may pass through a conduit (20) to a portal (21). A tainter valve (22) mounted in a tainter valve pit (23) controls the portal (21). A well (24) is in open communication with the tainter valve pit (23) via opening (25). The tainter valve (22) is actuated by suitable means as mechanism (26). This apparatus is best disclosed in Figure 3, wherein the tainter valve (22) is shown in closed position.

For the fishlock (3), water therefrom may pass through a conduit (27) to a portal (28). A tainter valve (29), mounted in tainter valve pit (30), controls the portal (28). The tainter valve pit (30) is in open communication with the well (24) via opening (31).

The flow of water into the fishlocks (2) and (3) is suitably distributed and diffused to avoid the formation of objectionable eddies or cross-currents. The primary flow into the fishlocks is distributed by a suitable diversion wall, shown as (32) in the fishlock (2) and (33) in the fishlock (3). Suitable baffles (34) may be used to further distribute the water.

It is to be noted, that while the diversion walls (32) and (33) are not symmetrical in the structure shown in Figure 1, this divergence is a matter of structural limitation only, and is not to be construed as being necessary to the functioning of the invention.

Apertured partitions (35) are disposed in a substantially horizontal plane across each of the fishlocks at an elevation slightly above that of the water inlet conduits (12) and (19). Other apertured partitions (36), substantially parallel to and spaced apart from the partitions (35) are likewise disposed across each of the fishlocks above the partitions (35). The apertured partitions (35) and (36) are effective in adequately diffusing the water flow into the fishlocks, minimizing eddies and cross-currents.

Figure 5:
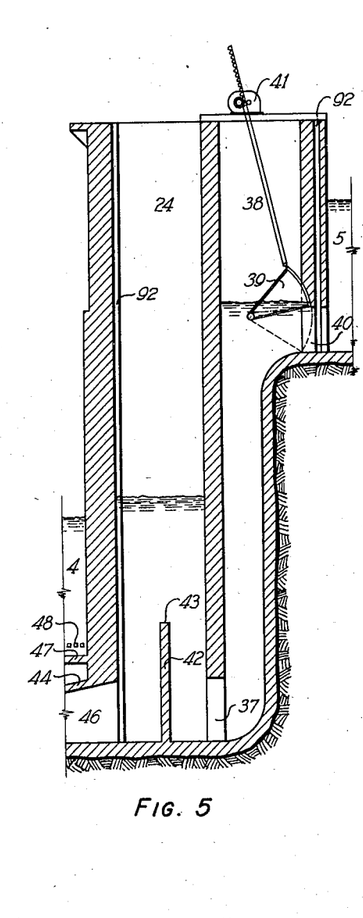
Figure 5 is a vertical sectional view of the device shown in Figure 1, taken substantially along the line 5—5 and in the direction indicated.

The well (24) in addition to receiving water discharged from the fishlocks (2) and (3), via the openings (25) and (31), also receives water directly from the forebay (5). Aperture (37), located at the lower portion of the well (24), provides communication with adjacent tainter valve pit (38). A tainter valve (39) is disposed in the tainter valve pit (38) and in controlling juxtaposition with aperture (40) leading to the forebay (5). The tainter valve (39) is suitably actuated by the mechanism (41). This condition is best shown in Figure 5, in which the tainter valve (39) is shown in opened position.

A baffle (42), disposed transversely through well (24) at a position between the openings (25) and (31), is provided with a stepped crest (43).

The entry bay (4) which is in gate controlled communication with the fishlocks (2) and (3), is an open conduit leading from zone or zones of fish concentration in the tailrace, and provides a channel whereby the fish may readily approach the fishlocks. The entry bay is provided with an apertured sub-floor (44), through the openings of which is discharged all of the water flowing through the well (24) via the mutually diverging conduits (45) and (46). The apertured sub-floor (44) has superimposed upon and spaced above it an apertured floor (47). Suitable grillage (48) is disposed above the apertured floor (47). The openings in the grillage (48) are of a size to prevent the passage therethrough of adult fish. The structure presented by the mutually diverging conduits (45) and (46), together with the apertured sub-floor (44), the apertured floor (47) and the grillage (48), provides adequate diffusion of water flowing from the well (24), throughout the entry bay (4). The water supplied to the entry bay (4), via the sub-floor (44), the apertured floor (47) and grillage (48), is discharged into the entry bay (4) at a sufficiently low velocity to present no counter-attraction to fish proceeding to the fishlocks (2) and (3).

Each of the fishlocks (2) and (3) is equipped with a downstream portal (49), leading from the entry bay (4), and an upstream portal (50), leading to the forebay (5).

The downstream portal (49) is of a height sufficient to encompass the maximum range of tail-water elevations. A plurality of segmental gate units (51), each vertically slidable in grooves (52), is disposed across the portal (49), effectively closing it excepting for an aperture (53). The aperture (53) may be selectively located to register with the prevailing tail-water elevation.

A closure member (54), adequate to close the aperture (53), is located contiguous to the segmental gate units (51), and is vertically slidable in grooves (55).

The segmental gate units (51) may be manipulated as by chain (56), suitably actuated by means not here shown. The closure member (54) may be operated as by cable (57), suitably actuated as by power operated drum (58).

The upstream portal (50) is of a height sufficient to operatively encompass the maximum range of forebay elevations. A plurality of segmental gate units (59), each vertically slidable in grooves (60), is disposed across the portal (50), effectively closing it excepting for an aperture (61). The aperture (61) may be selectively located to register with the prevailing forebay elevation.

A closure member (62), adequate to close the aperture (61), is located contiguous to the segmental gate units (59), and is vertically slidable in grooves (63).

The segmental units (59) may be manipulated as by a chain (64), suitably actuated by means not here shown. The closure member (62) may be operated as by cable (65), suitably actuated as by power operated drum (66).

Figure 9:
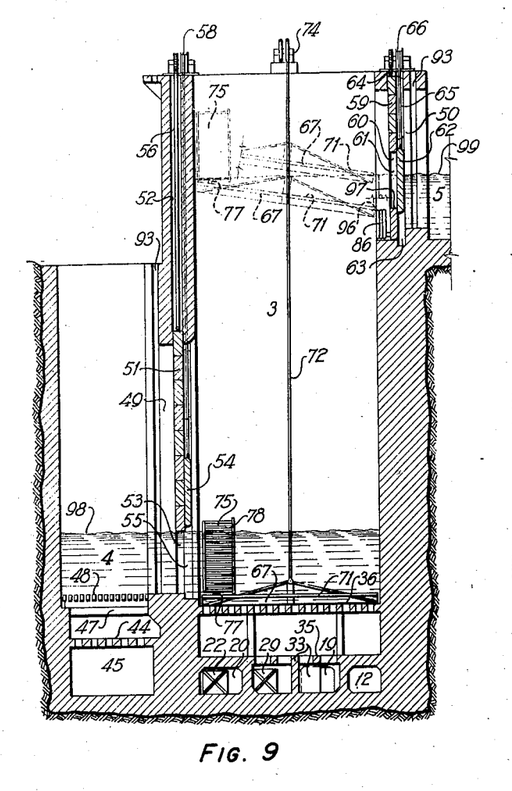
Figure 9 is a view of the subject matter shown in Figure 8 and showing the disposition of fish lift and gate parts under conditions of operation corresponding to low elevations of tailrace and of forebay levels.
Figure 11:
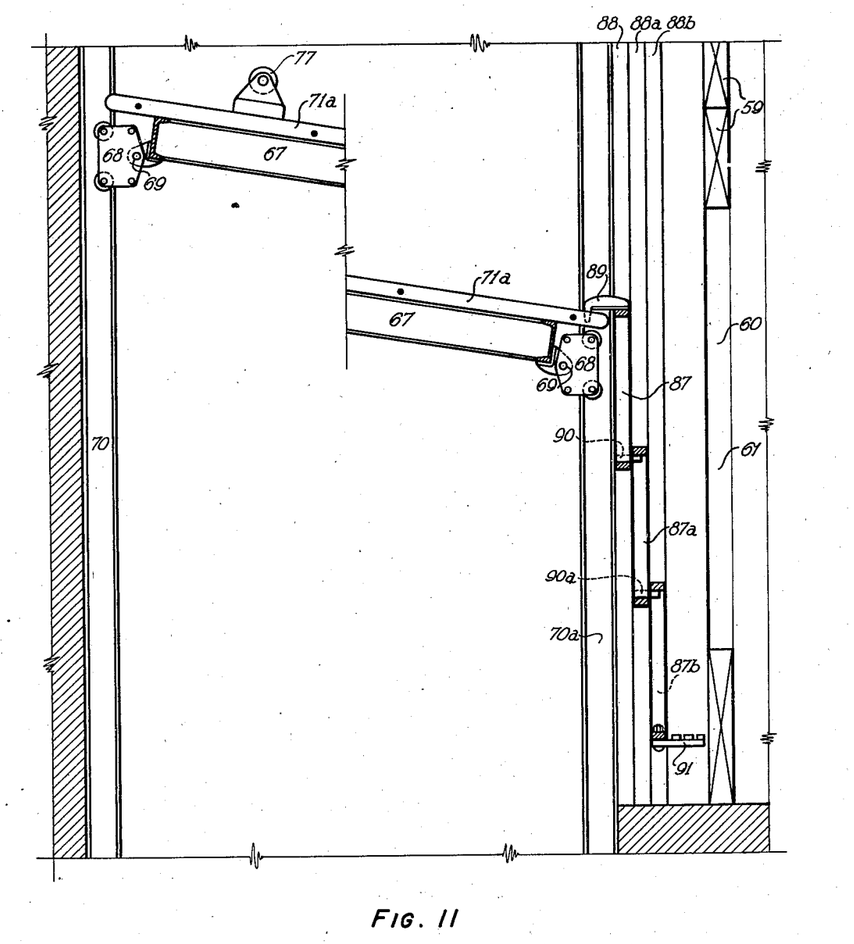
Figure 11 is a fragmentary vertical sectional view of the fish lift on an enlarged scale showing the details of lift retention and of the relation between the lift and the telescoping barrier. In this view, all of the accessory mechanism has been omitted.

The fishlocks (2) and (3) are each equipped with a fish lift (67). As shown in Figure 11, the fish lift (67) is provided with a plurality of roller carriers (68), which are pivotally mounted thereto as by pins (69). The roller carriers (68) are adapted to engage with suitable rails as by straddling I-beams (70) on the downstream wall of the fishlock and (70a) on the upstream wall thereof. The spaced relationship between the roller carriers (68) and the I-beams (70) and (70a) is preferably such that the fish lift (67) is given a position of limited obliquity excepting at its extreme lower limit of travel when it may assume a substantially horizontal position, as indicated in Figure 9. In the oblique position the higher end of the fish lift (67) is toward the downstream portion of the fishlock, the fish lift sloping downwardly toward the upstream portion. The fish lift (67) is floored with a grille structure (71), the individual bars (71a) of which are sufficiently closely spaced to prevent the passage therethrough of adult fish. These bars are preferably spaced in a direction coinciding with the slope of the fish lift (67).

The fish lifts (67) are suspended by means of pairs of cables (72) and (73), each of which is actuated by suitable means as power driven mechanism (74), permitting selective, independent operation of either of the lifts (67).

Figure 12:
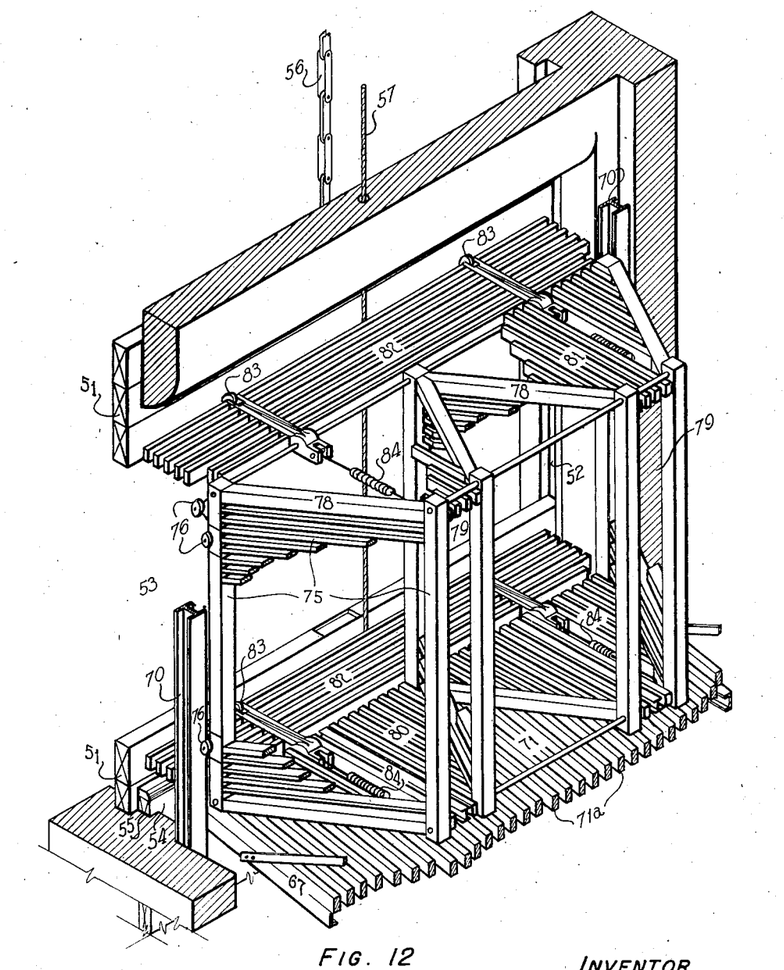
Figure 12 is an isometric fragmentary projection of the fish lift in position to receive fish, and disclosing details of construction of the fish trap associated therewith.

Each of the fishlocks (2) and (3) has disposed therein a fish trap structure (75), which is vertically movable along the inside face of the downstream wall thereof. A plurality of rollers as (76) is attached to the framework of the fish trap structure (75), and is adapted to engage the I-beam (70), maintaining the vertical alignment of the fish trap structure (75) therewith. The weight of the fish trap structure (75) is supported by the fish lift (67) via an interposed roller (77), which is suitably mounted thereon. The fish trap structure (75) is provided with a plurality of pairs of inwardly converging walls (78), terminating in restricted apertures (79), which are of a width to permit the passage therethrough of adult fish. The converging walls (78), together with a floor structure (80), and a ceiling structure (81), are of a suitable grille construction to bar the passage therethrough of adult fish. The floor (80), and the ceiling (81), of the fish trap structure (75), are augmented by a pair of horizontally hinged, spring loaded grilles (82), each of which is provided with suitable rollers (83), disposed along the extended edge thereof. The spring loading of the grilles (82) is accomplished by any suitable means, as by tension spring (84). The purpose of the hinged grilles (82) is to effectively maintain a fish screen between the body of the fish trap structure (75), and the inside face of the downstream wall of the fishlock structure, effectively compensating for any variations in the wall contour as that existing along the zone of transition from the wall to the segmental gate units (51).

A barrier (86), here shown as telescopic, may be disposed adjacent to and on the fishlock side of the segmental gate units (59). The telescoping barrier (86) comprises a plurality of vertical, parallel, spaced grille members here shown as three in number (87), (87a) and (87b), which are slidably disposed in substantially vertical grooves (88), (88a) and (88b). The member (87) is provided at its upper extremity with an inwardly protruding finger (89), adapted to engagement with the fish lift (67). The member (87) is further provided with an outwardly projecting spur (90), adapted to engage the upper margin of the grille member (87a) when elevated thereto. The grille member (87a) is likewise provided with a spur (90a) similarly adapted to engage the grille member (87b).

The lower edge of the grille member (87b) is provided with a grille toepiece (91) which extends toward the segmental gate units (59), effectively blocking the area therebetween. The construction of the telescoping barrier (86) is such that upon engagement by the fish lift (67) of the finger (89), the grille member (87) is elevated with the fish lift. Continued elevation causes the spur (90) to engage the grille member (87a) which in turn is lifted until the spur (90a) engages the grille member (87b), which in turn is elevated, until the fish lift has reached its maximum elevation consistent with the prevailing forebay level. The purpose of the barrier (86) is to provide means for excluding the fish from the space below the fish lift (67).

In order to facilitate inspection, adjustment, and/or repair of the tainter valve mechanisms and of the fishlocks, suitable means for excluding the forebay and entry bay waters may be provided, as emergency gates or stop logs placeable in grooves (92) and (93).

It is believed from the description heretofore given that a clear understanding may be had of the structure and of the assembly of the apparatus constituting the present invention. The operation of the apparatus as a whole is as hereinafter described.

As shown in Figure 1, the entry bay (4), which is the terminus of a suitable collecting means resulting in concentration of migrating fish therein, is provided with an adequate water supply, from the forebay (5) in conjunction with the drainage and operative discharge from the fishlocks (2) and (3), via the conduits (45) and (46), to retain the migrating fish therein. Were the water supply to the entry bay (4) limited to the discharges from the fishlocks (2) and (3), it would be subjected to wide fluctuations. To maintain a substantially constant flow of water to the entry bay (4), the flow of water from the forebay (5) through the aperture (40) may be controlled by suitable regulation of the tainter valve (39). As an alternative, not shown in Figure 1, the conduits (45) and (46) may be discharged into the tailrace at a point remote from the fishlock entrance and the discharge through aperture (40) utilized to produce a constant flow of water to the entry bay (4) by suitably regulating tainter valve (39).

It is assumed that the fishlock (2) is in operative position for receiving migrating fish from the entry bay (4), and that the fishlock (3) is in operative position for discharging migrating fish into the forebay (5). Under these conditions a flow of water from the forebay (5), enters the fishlock (2) via aperture (6), the well (7), the portal (8), past the partially opened tainter valve (9), through the tainter valve pit (10), and the conduit (12). Water thus admitted during the interval in which the fishlock (2) is in position for receiving migratory fish is discharged from the fishlock (2) via the opened aperture (53), into the entry bay (4). This discharge is preferably at a rate sufficiently above that of the water supplied by the conduits (45) and (46) to attract the migrating fish from the entry bay (4), into the fishlock (2), via the aperture (79) in the fish trap structure (75), which is disposed in alignment with the aperture (53). Upon reaching the interior of the fishlock (2), the fish find that they cannot continue their progress upstream and they normally will attempt to pass back out of the fishlock in search of another route upstream. The use of the fish trap structure (75) is required to retain the fish within the fishlock (2).

After a suitable interval, the closure member (54) is manipulated to seal the aperture (53), the tainter valve (9) is further opened and the water level within the fishlock (2) is raised until it coincides with that of the forebay (5). During this operation the fish lift (67) is elevated at a rate substantially equal to that of the rising water level within the fishlock (67), thus assuring that the fish will rise with the water to the elevation of the lock exit. The upward travel of the fish lift (67) is preferably terminated when the upstream edge thereof has reached an elevation substantially that of the sill of the aperture (61). Upon the attainment of equilibrium between the forebay level and the water level within the fishlock, the closure member (62) is manipulated to uncover the aperture (61), establishing open communication between the forebay (5) and the interior of the fishlock (2), permitting egress of the fish therefrom. To provide a definite current of water against which the fish can proceed, the tainter valve (22) is slightly opened. This causes a flow of water from the fishlock (2) into the well (24), and a corresponding flow of water from the forebay (5) into the fishlock (2). To prevent the passage of fish into that portion of the fishlock (2) under the fish lift (67), the barrier (86) is provided. To insure departure of all of the fish from the fishlock (2), the fish lift (67) may be further elevated until the grille floor (71) thereof is above the water level, as shown fragmentarily in dotted outline in the uppermost position of the fish lift (67) in Figure 9, thus gently urging the fish toward the exit.

After the fish have departed from the fishlock, the closure member (62) is manipulated to seal the aperture (61), after which the tainter valve (22) is further opened, lowering the water level within the fishlock (2), to coincide with the level of that in the entry bay. Concurrently therewith, the fish lift (67) is lowered to its initial position, bringing the fish trap structure (75) into alignment with the aperture (53). The tainter valve (22) is then closed, the closure member (54) is removed from the aperture (53), and the tainter valve (9) is opened sufficiently to provide a flow of water for lure purposes through the aperture (53) into the entry bay (4).

A substantially identical procedure is effected in the operation of the fishlock (3), the cycle of operation of the two locks being preferably so timed that during the interval that either of them is in operative position for receiving migrating fish from the entry bay (4), the other is being subjected to the operations of placing the closure member over the downstream aperture, filling with water, elevating the fish lift, releasing the entrained fish, returning the fish lift to its initial position, discharging the water to entry bay level, removing the closure member from the downstream aperture, and establishing the flow of lure water therefrom. The first named fishlock then enters upon a cycle of similar operations, the two fishlocks alternating in such a manner that, normally, at least one of them is in position to receive fish at any instant.

The flow of water, both discharge and operative, from the fishlocks (2) and (3) into the entry bay (4) may require augmentation to provide a flow adequate to attract migratory fish thereto. Such additional water may be taken from the forebay (5) into the well (24) via aperture (40), past tainter valve (39), into tainter valve pit (38), and through aperture (37). The baffle (42) serves to retard the velocity of flow of water thereagainst.

To compensate for the substantial variations in forebay and tailrace levels, usually prevailing in structures of this character, provisions have been made to regulate the positions of the apertures through the upstream and the downstream portals of the fishlocks.

Figure 8:
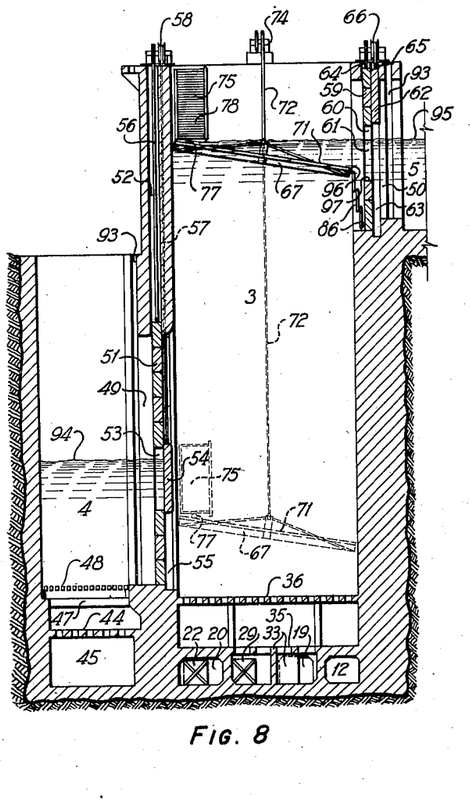
Figure 8 is a vertical sectional view of the device shown in Figure 1, taken substantially along the line 8—8 in the direction indicated. This view discloses the disposition of fish lift and gate parts under conditions of operation corresponding to mean elevations of tailrace and of forebay levels.

Let it be assumed that conditions of mean forebay and tailrace elevations prevail, resulting in fishlock operation adjustments as shown in Figure 8. In this view the aperture (53), of the downstream portal (49), is preferably so regulated with reference to entry bay level (94) that it extends downwardly from a position at or slightly above the level (94). This regulation is accomplished by appropriate positioning of segmental gate units (51). It is to be noted that the fish lift (67), in its lowered position, as indicated by broken lines in this view, is so placed that the fish trap structure (75) is located in alignment with the aperture (53). The aperture (61) of the upstream portal (50) is preferably so regulated with reference to the forebay level (95) that it extends downwardly from a position at or slightly above the level (95). This regulation is accomplished by appropriate positioning of the segmental gate units (59). It is to be noted that the fish lift, in its initial elevated position as shown in this figure, is so situated that its upstream edge is slightly above the sill (97) of the aperture (61). It is to be further noted that the telescoping barrier (86), depending from the edge (96) of the fish lift (67), effectually seals the interval between the edge (96) and the sill (97) against the passage therethrough of fish. To insure departure into the forebay of all of the fish, the fish lift (67) may be further elevated until its edge (96) is substantially at the elevation of the forebay level (95). Such departure is rendered effective by the instinctive habit of fish to swim away from shoaling water. This action on the part of the fish is facilitated by the placement of the bars (71a) of the grille floor (71) in the direction of desired travel.

For conditions of minimum forebay and tailrace elevations as indicated in Figure 9, the aperture (53) through the downstream portal (49) is correspondingly adjusted with reference to minimum entry bay elevation (98), and aperture (61), through the upstream portal (50) is similarly adjusted with reference to the minimum forebay elevation (99). It is to be noted that under these conditions the fish lift (67) when in its lowermost position may, if the construction necessitates, assume a substantially horizontal position as shown in Figure 9. It is to be further noted that the fish lift (67), in its initial elevated position, may not extend the telescoping barrier (86).

Figure 10:
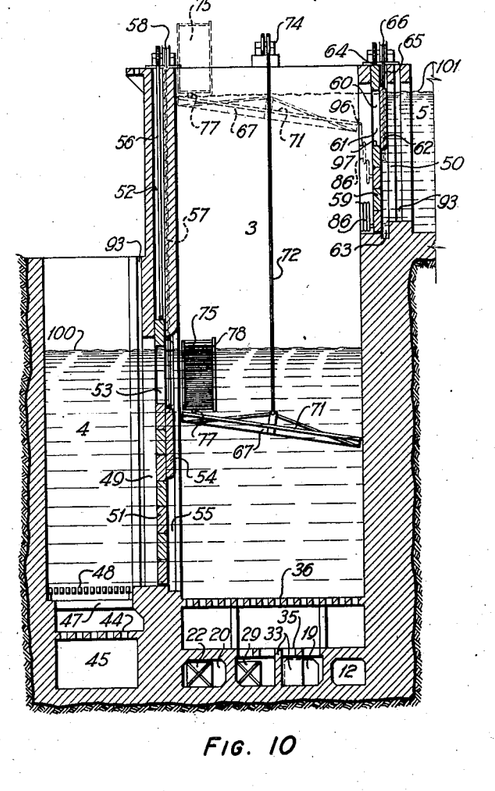
Figure 10 is a view of the subject matter shown in Figure 8 and showing the disposition of fish lift and gate parts under conditions of operation corresponding to high elevations of tailrace and of forebay levels.

Under conditions of maximum forebay and tailrace elevations, as indicated in Figure 10, the aperture (53) through the downstream portal (49) is suitably regulated with reference to maximum entry bay elevation (100), and the aperture (61) through the upstream portal (50) is similarly regulated with reference to the maximum forebay elevation (101).

The closure member (54) may be manipulated with reference to the aperture (53), so as to be displaced upwardly or downwardly therefrom to effect the opening thereof, as may be required by the entry bay elevation. Similarly the closure member (62) may be so manipulated with reference to the aperture (61).

While the structure shown and described is an embodiment of the invention, it is to be understood that the general structure, arrangement and combination of parts may be altered by those skilled in the art without departing from the spirit of the invention, as defined by the following claims.

Having described our invention, what we claim as new and wish to secure by Letters Patent is:

1. The method of effecting vertical transfer of migrating fish, which consists in concentrating the fish in an entry bay and then subjecting them to the lure effect of hydraulic flows from alternately actuated fishlocks.

2. The method of effecting vertical transfer of migrating fish, which consists in concentrating the fish in an entry bay, subjecting them to hydraulic flows from alternately actuated fishlocks, to lure them into the locks and then elevating them in the locks and releasing them therefrom.

3. The method of effecting vertical transfer of migrating fish, which consists in concentrating the fish in an entry bay, subjecting them to hydraulic flows from alternately actuated fishlocks to lure them into the locks, and ejecting them therefrom.

4. The method of effecting vertical transfer of migrating fish, which consists in subjecting them to hydraulic flows from alternately actuated fishlocks to lure them into the locks and then elevating them in the locks and releasing them therefrom.

5. The method of effecting vertical transfer of migrating fish which consists in concentrating the fish in an entry bay by means of the attraction of a flow of water maintained in part by a fixed flow, subjecting the fish to hydraulic flows from alternately actuated fishlocks to lure them into the locks and then elevating them in the locks.

6. The method of effecting vertical transfer of migrating fish, which consists in concentrating the fish in an entry bay by means of the attraction of a flow of water maintained in part by a regulated flow, subjecting the fish to hydraulic flows from alternately actuated fishlocks to lure them past non-return means into the locks and then elevating them in the locks.

7. The method of effecting vertical transfer of migrating fish, which consists in concentrating the fish in an entry bay by means of the attraction of a flow of water maintained in part by a regulated flow, subjecting the fish to hydraulic flows from alternately actuated fishlocks to lure them into the locks and restraining them against return and then elevating them in the locks and urging them therefrom by shoaling.

8. The method of effecting vertical transfer of migrating fish, which consists in concentrating the fish in an entry bay by means of the attraction of a flow of water maintained in part by a regulated flow, subjecting the fish to hydraulic flows from alternately actuated fishlocks to lure them into the locks and restraining them against return and then elevating them in the locks and effecting their non-return departure therefrom.

9. The method of effecting vertical transfer of migrating fish, which consists in concentrating the fish in an entry bay by means of the attraction of a flow of water maintained in part by a regulated flow, subjecting the fish to hydraulic flows from alternately actuated fishlocks to lure them into the locks and restraining them against return and then elevating them in the locks to an elevation suitable to prevailing forebay conditions, and then urging them therefrom.

10. The method of effecting vertical transfer of migrating fish, which consists in concentrating the fish in an entry bay by means of the attraction of a flow of water maintained in part by a regulated flow diffused into the entry bay at a velocity below that of the first named flow, subjecting the fish to hydraulic flows from alternately actuated fishlocks to lure them into the locks and restraining them against return and then elevating them in the locks and urging them therefrom by shoaling.

11. In a structure of the class described, the combination of a dam having a forebay and a tailrace, a plurality of fishlocks disposed in said dam, an entry bay disposed adjacent the dam and communicating with the tailrace, a plurality of gate controlled portals disposed one between each of the fishlocks and the forebay at the level of said forebay, a plurality of second gate controlled portals disposed one between each of the fishlocks and the entry bay at the level of said entry bay, a plurality of valve controlled conduits disposed one between each of the fishlocks and the forebay, a plurality of second valve controlled conduits disposed one between each of the fishlocks and the entry bay, a plurality of fish lifts movably disposed, one in each of the fishlocks, power actuated means for moving the fish lifts and a valve controlled conduit disposed between the forebay and the entry bay.

12. In a structure of the class described, the combination of a dam having a forebay and a tailrace, an entry bay disposed adjacent the dam and communicating with the tailrace, and a plurality of fishlocks disposed in said dam, each of said fishlocks being provided with a gate controlled portal communicating with the forebay, a second gate controlled portal communicating with the entry bay, a valve controlled conduit communicating with the forebay, a second controlled conduit communicating with the entry bay, a vertically displaceable fish lift, power operative means for actuating the fish lift, means in connection with the fish lift to prevent return of the fish, said means being adapted for registry with the said second gate controlled portal when the fish lift is at the entry bay level.

13. A dam structure comprising dual fishlocks, means to introduce water into and to discharge it from the fishlocks, a fish lift in each lock, the respective lifts being alternately operable to a fishing and to a discharging position and means in connection with the locks to induce the fish to enter one of the lifts when it is in a fishing position, and to leave the other of said lifts when it is in a discharging position.

14. A dam structure comprising dual fishlocks, means to alternately introduce water into and discharge it from the fishlocks, a fish lift in each lock, the respective lifts being alternately operable to a fishing and to a discharging position and means in connection with the locks to induce fish to enter one of the lifts when it is in a fishing position and to leave the other of said lifts when it is in a discharging position.

15. A dam structure comprising a pair of adjacently situated vertically disposed fishlocks, means to introduce water into and to discharge it from the fishlocks, a fish lift in each lock, the respective lifts being alternately operable to a fishing and to a discharging position and means in connection with the locks to induce fish to enter one of the locks, when it is in a fishing position and to leave the other of the lifts when it is in a discharging position.

16. A dam structure comprising a pair of adjacently situated vertically disposed fishlocks, means to alternately introduce water into and discharge it from the fishlocks, a fish lift in each lock, the respective lifts being alternately operable to a fishing and to a discharging position and means in connection with the locks to induce fish to enter one of the lifts when it is in a fishing position and to leave the other of the lifts when it is in a discharging position.

17. A dam structure comprising dual fishlocks, means to alternately introduce water into and to discharge it from the fishlocks, a fish lift in each lock, the respective lifts being alternately operable to a fishing and to a discharging position and means in connection with the locks and their fish lifts to induce the fish to enter one of the lifts when it is in fishing position and to effect ejection of the fish from the other of said locks when it is in a discharging position.

18. A dam structure comprising dual fishlocks, means to alternately introduce water into and to discharge it from the locks, a fish lift in each lock, the respective lifts being operable to a fishing and to a discharging position, and means in connection with the locks and their fish lifts to induce fish to traverse a non-return entry to one of the lifts when it is in a fishing position and to effect a non-return discharge of the fish from the other of said lifts when it is in a discharging position.

19. A dam structure comprising dual fishlocks, means for introducing water into the locks and to alternately raise and lower the level of the water within the locks to predetermined levels, a fish lift in each lock, and means in connection with the respective lifts to alternately effect the ascent of one of the lifts to a discharging position, and the descent of the other of said lifts to a fishing position, and means in connection with the locks to induce fish to enter one of the lifts when it is in a fishing position and to leave the other of said lifts when it is in a discharging position.

20. A dam structure comprising dual fishlocks, means for introducing water into the locks and to alternately raise and lower the level of the water within the locks to predetermined levels, a fish lift in each lock, and means in connection with the locks and their lifts to induce fish to make a non-return entry of one of the lifts when it is in fishing position and to effect a non-return ejection of the fish in the other of said lifts, when it is in a discharging position.

21. A dam structure comprising dual fishlocks, in gate controlled communication at their upper and lower extremities with a forebay and an entrance bay respectively, means to introduce water into the locks to alternately raise and lower the level of the water within the locks to forebay and entrance bay elevations, a fish lift in each lock, means in connection with the respective lifts to alternately cause one of said lifts to ascend to forebay elevation and the other of said lifts to descend to entrance bay elevation, and means in connection with the locks to induce fish to enter one of the lifts when it is in entrance bay elevation and to leave the other of said lifts when it is at forebay elevation.

22. A dam structure comprising dual fishlocks in gate controlled communication at their upper and lower extremities with a forebay and an entrance bay respectively, means to introduce water into the locks to alternately raise and lower the level of the water within the locks to forebay and entrance bay elevations, a fish lift in each lock, means in connection with the respective lifts to alternately cause one of said lifts to ascend to forebay elevation and the other of said lifts to descend to entrance bay elevation, and means in connection with the locks and their fish lifts to induce fish to make a non-return entry of one of the lifts when it is at entrance bay elevation and to leave the other of said lifts when it is at discharging position.

23. A dam structure comprising dual fishlocks in gate controlled communication at their upper and lower extremities with a forebay and an entrance bay respectively, means to introduce water into the locks to alternately raise and lower the level of the water within the locks to forebay and entrance bay elevations, a fish lift in each lock, means in connection with the respective lifts to alternately cause one of said lifts to ascend to forebay elevation and the other of said lifts to descend to entrance bay elevation, and means in connection with the locks and their respective fish lifts to induce the fish to traverse a non-return entry to one of the lifts when it is at entrance bay elevation and to effect a non-return ejection of the fish from the other of said lifts when it is at forebay elevation.

HARLAN B. HOLMES.
HENRY F. BLOOD.
MILO C. BELL.